United States Patent
Reichert

(10) Patent No.: US 8,015,896 B2
(45) Date of Patent: Sep. 13, 2011

(54) ARRANGEMENT FOR OPERATING AT LEAST ONE SHIFT FORK IN A TRANSMISSION

(75) Inventor: Heinz Reichert, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 60 days.

(21) Appl. No.: 12/566,027

(22) Filed: Sep. 24, 2009

(65) Prior Publication Data
US 2010/0095797 A1 Apr. 22, 2010

(30) Foreign Application Priority Data
Oct. 20, 2008 (DE) .......................... 10 2008 042 960

(51) Int. Cl.
*F16H 59/04* (2006.01)
(52) U.S. Cl. .................................. 74/473.36; 74/473.1
(58) Field of Classification Search ................ 74/473.1, 74/473.36, 473.37; 267/150, 158
See application file for complete search history.

(56) References Cited

U.S. PATENT DOCUMENTS

| | | | |
|---|---|---|---|
| 4,098,380 A | 7/1978 | Thomas | |
| 4,228,693 A * | 10/1980 | Kelbel | 74/339 |
| 4,529,080 A | 7/1985 | Dolan | |
| 4,770,280 A * | 9/1988 | Frost | 192/53.343 |
| 4,827,792 A * | 5/1989 | Uetake et al. | 74/473.1 |
| 5,113,715 A | 5/1992 | Weyman | |
| 5,159,847 A * | 11/1992 | Williams et al. | 74/337.5 |
| 5,517,876 A | 5/1996 | Genise et al. | |
| 6,082,514 A | 7/2000 | Averill | |
| 6,619,153 B2 | 9/2003 | Smith et al. | |
| 6,619,159 B2 | 9/2003 | Galat | |
| 6,845,685 B2 * | 1/2005 | Brandwitte et al. | 74/473.25 |
| 6,942,435 B2 * | 9/2005 | Schaible et al. | 408/124 |
| 7,311,015 B2 * | 12/2007 | Kluge | 74/337.5 |
| 2005/0223833 A1 * | 10/2005 | Ewing et al. | 74/473.1 |
| 2006/0090584 A1 * | 5/2006 | Ho | 74/473.36 |

FOREIGN PATENT DOCUMENTS

| | | |
|---|---|---|
| DE | 1 005 385 | 3/1957 |
| DE | 1 155 354 | 10/1963 |
| DE | 28 15 202 A1 | 10/1978 |
| DE | 690 07 749 T2 | 7/1994 |
| DE | 199 61 096 A1 | 12/2000 |
| EP | 0 695 892 A2 | 2/1996 |

* cited by examiner

*Primary Examiner* — Richard W Ridley
*Assistant Examiner* — Terence Boes
(74) *Attorney, Agent, or Firm* — Davis & Bujold, P.L.L.C.

(57) ABSTRACT

An arrangement for actuating at least one shift fork (1) in a transmission of a vehicle. The arrangement has at least one actuating device (3), which is mounted on a shift rail (8), that actuates the shift fork (1) to undergo an at least axially directed shifting movement such that either a one-directional spring deflection of a two-directional spring deflection of the shift fork (1) is provided, and such spring deflected action is provided by at least one bent spring (12).

4 Claims, 2 Drawing Sheets

ARRANGEMENT FOR OPERATING AT LEAST ONE SHIFT FORK IN A TRANSMISSION

This application claims priority from German patent application serial no. 10 2008 042 960.0 filed Oct. 20, 2008.

FIELD OF THE INVENTION

The present invention concerns an arrangement for actuating at least one shift fork in a transmission of a vehicle.

BACKGROUND OF THE INVENTION

For example, from the document U.S. Pat. No. 6,619,153 B2 a shift system is known, which has a spring-loaded shift fork arrangement for engaging various speed ranges in a transmission. For this, the shift fork is mounted to move axially on a shift rail and is operated by an actuating device. By axial displacement of the shift fork a sleeve in active connection with the shift fork is moved so as to engage a desired speed range in the transmission. The shift fork is mounted on the shift rail with a spiral spring designed as a compression spring. In this way the shifting movement of the shift fork is sprung in both directions.

In addition, from the document U.S. Pat. No. 4,529,080 a similar arrangement is known for actuating a shift fork in a drivetrain of a vehicle. In this arrangement too, the shift fork is mounted on a shift rail with a compression spring. Thus, the shifting movement is again sprung in both directions.

Both of these known arrangements have the disadvantage that owing to the compression spring system used, they take up considerable axial structural space in order to realize the two-directional spring action. Disadvantageously, this also increases the structural space needed for a transmission in which the system is incorporated.

SUMMARY OF THE INVENTION

Accordingly, the purpose of the present invention is to propose an arrangement for actuating at least one shift fork in a transmission of a vehicle as described earlier, which while maintaining the sprung characteristic of the shift fork, takes up the least possible structural space.

Thus, an arrangement for actuating at least one shift fork in a transmission of a vehicle with at least one actuating device is proposed, which actuates the shift fork mounted on a shift rail to undergo an at least axially directed shift movement, such that two-directional or one-directional springing if the shift fork is provided. According to the invention, the two-directional or one-directional deflection of the shift fork is provided by at least one bent spring or suchlike.

Compared with the compression springs used in the prior art, the bent spring used, which can for example be in the form of a blade spring, a spring clip or suchlike, has the substantial advantage that no additional axial space is needed at the shift fork in order to transmit the shifting movement from the actuating device to the shift fork under spring action. Other spring elements or suchlike can also be used, which also have this structural space advantage.

In an advantageous embodiment variant of the invention it can be provided that a lever plate or suchlike is mounted to rotate on the shift fork about a bearing bolt orientated approximately transversely to the shift rail, this lever plate being pre-stressed against the shift fork by the bent spring so that a shifting movement transmitted from the actuating device to the lever plate can be transferred via the bent spring to the shift fork. Other design forms as well are possible, which enable a corresponding transmission of the shifting movement from the actuating device to the shift fork.

To enable force to be transmitted from the lever plate to the shift fork via the bent spring or suchlike, according to a feature of the invention it can be provided that the arms of the bent spring are each in contact with a respective carrier pin or suchlike of the lever plate. Other active connection types between the bent spring and the lever plate could also be used.

For, in a related further development of the invention the actuating device can comprise a guide-plate or suchlike fixed on a main shaft, the plate being in active connection via at least one recess with at least one actuating pin of the lever plate. This actuation means enables force to be transferred from the actuating device to the shift fork in as space-saving a manner as possible, so that the transmission in which the arrangement according to the invention is installed can also be made shorter and more compact.

It is conceivable and preferable that a plurality of shift forks are actuated by the guide-plate of the actuating device, for example if a plurality of recesses are provided. Each recess can be designed in such manner that rotational movement of the guide-plate results in axial movement of the shift fork. This is enabled, for example, by an angular recess shape. However, other recess shapes are also conceivable. If two shift forks are actuated by the guide-plate of the actuating device, then it is for example possible for one of the two shift forks to be a two-directional or one-directional deflected shift fork and the other of the two shift forks to be a shift fork without a spring action. The spring-deflected shift fork is preferably used to actuate a shift sleeve or a claw clutch without any synchronization means, whereas with the unsprung shift fork it is preferable to actuate a shift sleeve or claw clutch which has a synchronizing device and/or a blocking synchronizer. It is also possible, of course, for both of the shift forks which are to be actuated to be made as two-directional or one-directional spring-deflected shift forks, or for one of the two shift forks to be a two-directional spring-deflected shift fork while the other of the two shift forks is made as a one-directionally sprung shift fork.

The arrangement according to the invention can be used with transmissions of any kind. For example the shift fork can be used to engage and disengage a crawling gear in an all-wheel transfer box, by actuating a corresponding shift sleeve or suchlike.

BRIEF DESCRIPTION OF THE DRAWINGS

Below, the invention is explained in more detail with reference to the drawings, which show.

DETAILED DESCRIPTION OF THE PREFERRED EMBODIMENTS

Figure 1:
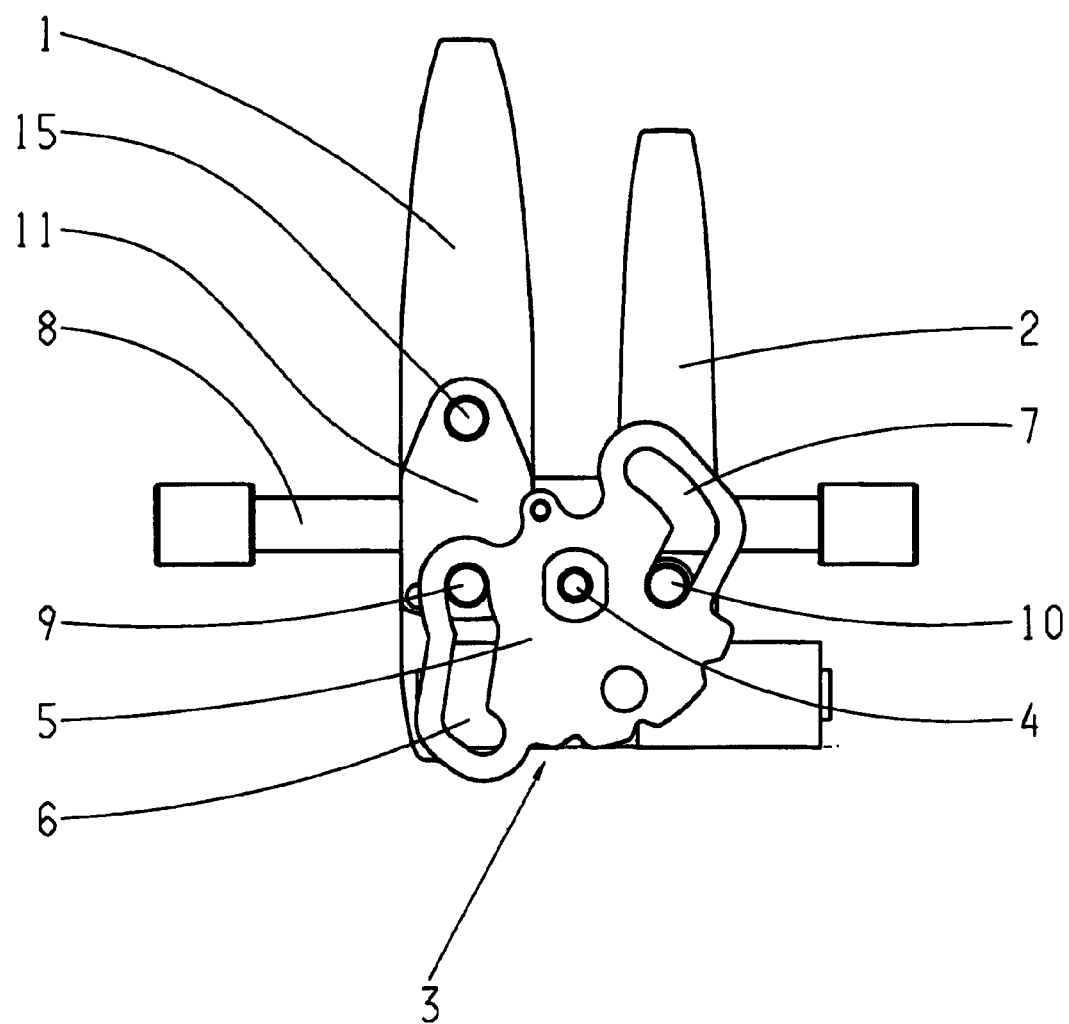
FIG. 1: Schematic view of a possible embodiment variant of an arrangement according to the invention for actuating shift forks.

FIG. 1 shows an example of a possible embodiment variant of an arrangement for actuating shift forks 1, 2 which are mounted to move at least axially on a shift rail 8. It is also possible for only one shift fork, or else for more shift forks to be actuated.

Figure 3:
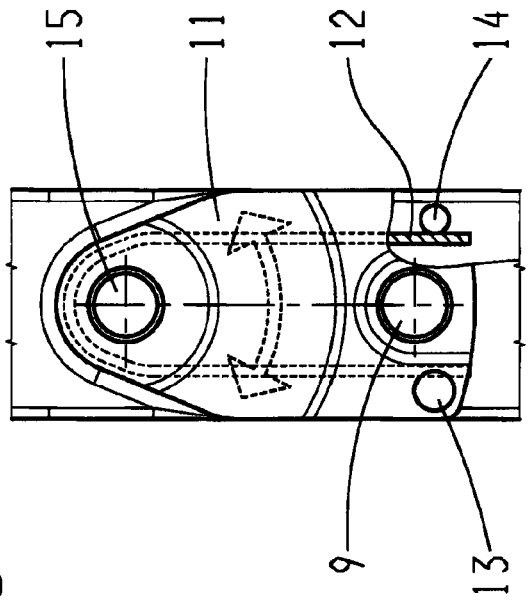
FIG. 3: Detailed view of part of FIG, 2.
Figure 2:
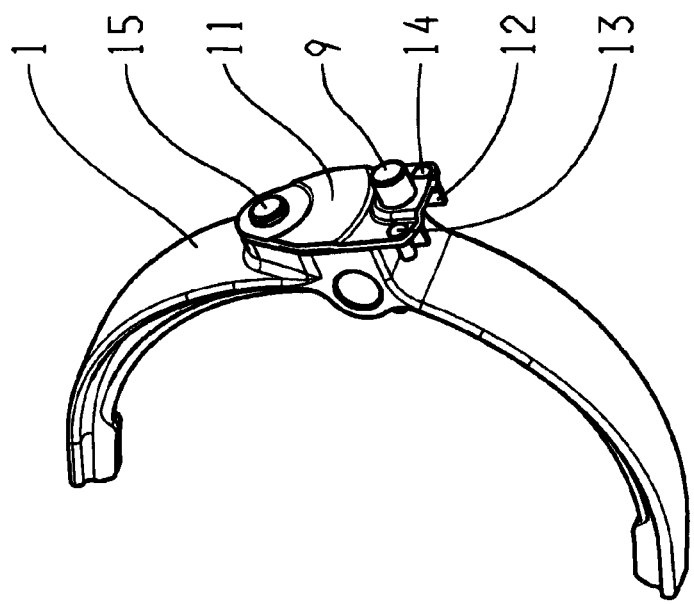
FIG. 2: Detailed partial view of the shift fork to be actuated.

The arrangement according to the invention comprises an actuating device 3, with a guide-plate 5 fixed on a main shaft 4. In the embodiment variant illustrated, the guide-plate 5 has two slots 6, 7, each of the slots 6, 7 being respectively associated with one of the shift forks 1, 2 to be actuated. A respective actuating pin 9, 10 of the associated shift fork 1, 2 extends into each respective slot 6, 7. In this case the shift fork 1 is a two-directional spring-deflected shift fork whereas the shift fork 2 is unsprung. Pivoting movement of the guide-plate 5 is transmitted to the shift fork 2 via the actuating pin 10 guided in the slot 7. For this purpose, the actuating pin 10 can be fixed directly on the shift fork 2. As can be seen from FIGS. 2 to 4, the actuating pin 9 is fixed on a lever plate 11 mounted to pivot or rotate on the shift fork 1. The lever plate 11 is mounted on the shift fork 1 by means of a bearing bolt 15 orientated approximately transversely to the shift rail 8. Accordingly, pivoting movement of the guide-plate 5 is transmitted to the lever plate 11 via the actuating pin 9 guided in the slot 6.

Figure 4:
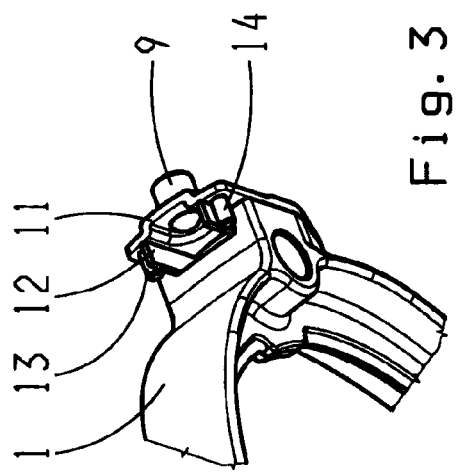
FIG. 4: Enlarged view of a lever plate with a bent spring, mounted to rotate on the shift fork.

In this case a bent spring 12 is provided for the two-directional reflection of the shift fork 1. The bent spring 12 can be in the form of a spring clip, a bracket, a spring with extending arms, or suchlike. The bent spring 12 is supported with its arms against carrier pins 13, 14 of the lever plate 11, as can be seen particularly clearly in FIG. 4. Thus, pivoting movement of the lever plate 11 is transmitted elastically to the shift fork by the bent spring 12, so that the shift fork 1 moves in the axial direction to activate a shift sleeve or suchlike. The pivoting movement of the lever plate 11 is indicated in FIG. 4 by a double arrow.

Thanks to the use of the bent spring 12 and the associated transfer mechanism for bringing about the axial movement of the shift fork 1 in the arrangement proposed according to the invention, two-directional spring-deflected action of the shift fork is achieved with a minimum need for axial structural space.

INDEXES

1 Shift fork
2 Shift fork
3 Actuating device
4 Main shaft
5 Guide-plate
6 Slot
7 Slot
8 Shift rail
9 Actuating pin
10 Actuating pin
11 Lever plate
12 Bent spring
13 Carrier pin
14 Carrier pin
15 Bearing bolt

The invention claimed is:

1. An arrangement for actuating at least one shift fork (1) in a transmission of a vehicle, the arrangement comprising: at least one actuating device (3) that actuates the shift fork (1), which is axially slidably supported on a shift rail (8), wherein a lever plate is pivotally fixed to the shift fork by a bearing bolt that is oriented transversely to the shift rail, and the at least one bent spring is supported between the lever plate and the shift fork such that the lever plate, via the at least one bent spring, is pre-stressed against the shift fork, such that shifting movement transmitted the actuating device pivotally biases the lever plate which axially slides the shift fork along the shift rail via the at least one bent spring, wherein arms of the at least one bent spring are each in contact with a respective carrier pin, the carrier pins being fixed to the lever plate to undergo an at least axially directed shifting movement such that one of a one-directional spring deflection and a two-directional spring deflection of the shift fork (1) occurs, and
the spring deflection being provided by at least one bent spring (12) such that the shift fork (1) is biased axially along the shift rail (8).

2. The arrangement according to claim 1, wherein the actuating device (3) comprises a guide-plate (5) fixed on a main shaft (4), and the guide-plate (5) has at least one slot (6), which receives at least one actuating pin (9) that is fixed to the lever plate (11).

3. The arrangement according to claim 2, wherein the slot (6) is designed such that rotational movement of the guide-plate (5) results in a spring deflected axial movement of the shift fork (1) along the shift rail (8) in two axial directions.

4. An arrangement for actuating a shift fork (1) in a transmission of a vehicle, the arrangement comprising:
a guide plate (5) being fixed to a main shaft (4) and having a slot (6);
a lever plate (11) being pivotably supported at one end by the shift fork (1) and having an actuating pin (9) fixed to an opposite remote end of the lever plate (11), and the actuating pin (9) engages the slot (6) such that rotation of the guide plate (5) causes the actuating pin (9) to slide along the slot (6) and pivot the lever plate (11); and
the remote end of the lever plate (11) having two carrier pins (13, 14) which are fixed to a side of the lever plate (11) that is opposite a side on which the actuating pin (9) is fixed, the two carrier pins (13, 14) respectively engage an arm of a bent spring (12) such that pivoting movement of the lever plate (11) is transmitted to the shift fork (1) to bias the shift fork (1) axially along a shift rail (8).

* * * * *